(12) United States Patent
Gerecht et al.

(10) Patent No.: US 11,297,910 B1
(45) Date of Patent: Apr. 12, 2022

(54) TOOL FOR POSITIONING AND ALIGNING UNIFORM ACCOUTERMENT

(71) Applicant: Mentor Enterprises, Inc., Madison, AL (US)

(72) Inventors: Mark Gerecht, Madison, AL (US); Matthew Dail, Madison, AL (US)

(73) Assignee: Mentor Enterprises, Inc., Madison, AL (US)

( * ) Notice: Subject to any disclaimer, the term of this patent is extended or adjusted under 35 U.S.C. 154(b) by 310 days.

(21) Appl. No.: 16/404,260

(22) Filed: May 6, 2019

(51) Int. Cl.
*A44C 3/00* (2006.01)
*A41D 29/00* (2006.01)
*G01C 9/00* (2006.01)

(52) U.S. Cl.
CPC .............. *A44C 3/002* (2013.01); *A41D 29/00* (2013.01); *G01C 9/00* (2013.01)

(58) Field of Classification Search
CPC ................................. A44C 3/002; A41D 29/00
USPC .......................................................... 33/653
See application file for complete search history.

(56) References Cited

U.S. PATENT DOCUMENTS

| | | |
|---|---|---|
| 657,268 A | 9/1900 | Forsyth |
| 2,387,986 A | 10/1945 | Evans |
| 3,129,515 A | 4/1964 | Edmund |
| 3,331,342 A | 7/1967 | Herrmann |
| 3,376,651 A | 4/1968 | Carey |
| 4,302,884 A | 12/1981 | Pallone |
| 5,063,684 A | 11/1991 | Winters |
| 6,311,408 B1 * | 11/2001 | Madayag ............... A41D 27/20 33/1 G |
| 7,100,295 B1 * | 9/2006 | Chang ..................... B43L 7/027 33/1 B |
| 7,559,153 B2 | 7/2009 | Allen |
| 7,587,839 B1 | 9/2009 | Winter |
| 7,637,028 B2 | 12/2009 | Allen |
| 8,112,898 B2 | 2/2012 | Allen |
| 8,359,763 B2 | 1/2013 | Allen |
| 8,640,366 B1 | 2/2014 | Solberg |
| 9,743,697 B1 * | 8/2017 | Gerecht ................. A41D 29/00 |
| 2007/0294924 A1 | 12/2007 | Schriver |
| 2013/0061484 A1 * | 3/2013 | Davignon .............. A41D 29/00 33/653 |
| 2015/0335188 A1 | 11/2015 | Davis |

* cited by examiner

*Primary Examiner* — Gary C Hoge
(74) *Attorney, Agent, or Firm* — Maynard Cooper & Gale, P. C.; Jon E. Holland

(57) ABSTRACT

A tool to position accouterments on a uniform includes a component having at least one opening extending through the component. The opening can receive an accouterment to be placed on a uniform. The tool has one or more reference indicators indicated around the opening on at least one side. The accouterment can be placed in the opening and then appropriately positioned using the reference indicators. The tool can also have a grid that can be used to place accouterments on the uniform with respect to both horizontal and vertical positions.

17 Claims, 8 Drawing Sheets

TOOL FOR POSITIONING AND ALIGNING UNIFORM ACCOUTERMENT

BACKGROUND

The present application generally relates to a tool for positioning and aligning accouterments, such as insignia, ribbons, and badges, to be affixed on a uniform.

The placement of accouterment on the uniforms of military personnel or first responders may be defined by regulations or guidelines. The regulations or guidelines define where accouterments are to be placed on the uniform and the position and orientation of each accouterment relative to the uniform. In addition, depending on the person, the position and orientation of an accouterment on the person's uniform may vary. For example, officers and enlisted personnel have different requirements defining the position and orientation for the placement of an accouterment on the uniform. Further, male and female personnel may have different requirements defining the position and orientation for the placement of an accouterment on the uniform.

Complying with the regulations or guidelines associated with the placement of an accouterment on the uniform can be difficult and time consuming for military personnel or first responders because the regulations or guidelines may not be known and, even if the regulations or guidelines are known, the physical placement of the accouterment on the uniform in compliance with the regulations or guidelines can still be problematic because of the difficulty in trying to measure distances on a uniform.

SUMMARY

The present application generally pertains to a tool for positioning and aligning accouterments, such as insignia, ribbons, badges and citations, on the uniform of military personnel or first responders. The tool has an opening that can receive may different types and sizes of accouterments. Surrounding the opening are several different reference indicators that can provide information regarding the center (with respect to a width dimension) of the opening. Other reference indicators can be used in conjunction with the sides of the accouterment to center an accouterment in the opening. In addition, still other reference indicators can provide information on how far into the opening (with respect to an outer edge of the tool) an accouterment may be located. The tool also includes a grid that can be used for both the horizontal and vertical placement of accouterments on the uniform. The horizontal and vertical lines of the grid can be used to simultaneously determine specific horizontal and vertical dimensions when placing an accouterment of the uniform. In addition, the tool also has tabs that have different widths that correspond to different spacing requirements. The tabs can be used to ensure that the accouterment being placed is properly spaced on the uniform. When the tool is placed on the uniform and aligned appropriately for the accouterment to be placed on the uniform, the tool can provide for the proper spacing of the accouterment on the uniform and assist with the alignment or orientation of the accouterment on the uniform.

One advantage of the present application is that the tool is made from a clear material to enable the markings on the tool to be imposed on a uniform.

Another advantage of the present application is that the tool has a compact size to permit the tool to be carried on a person.

Still another advantage of the present application is that the tool has easily visible markings when the tool is placed against a uniform.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
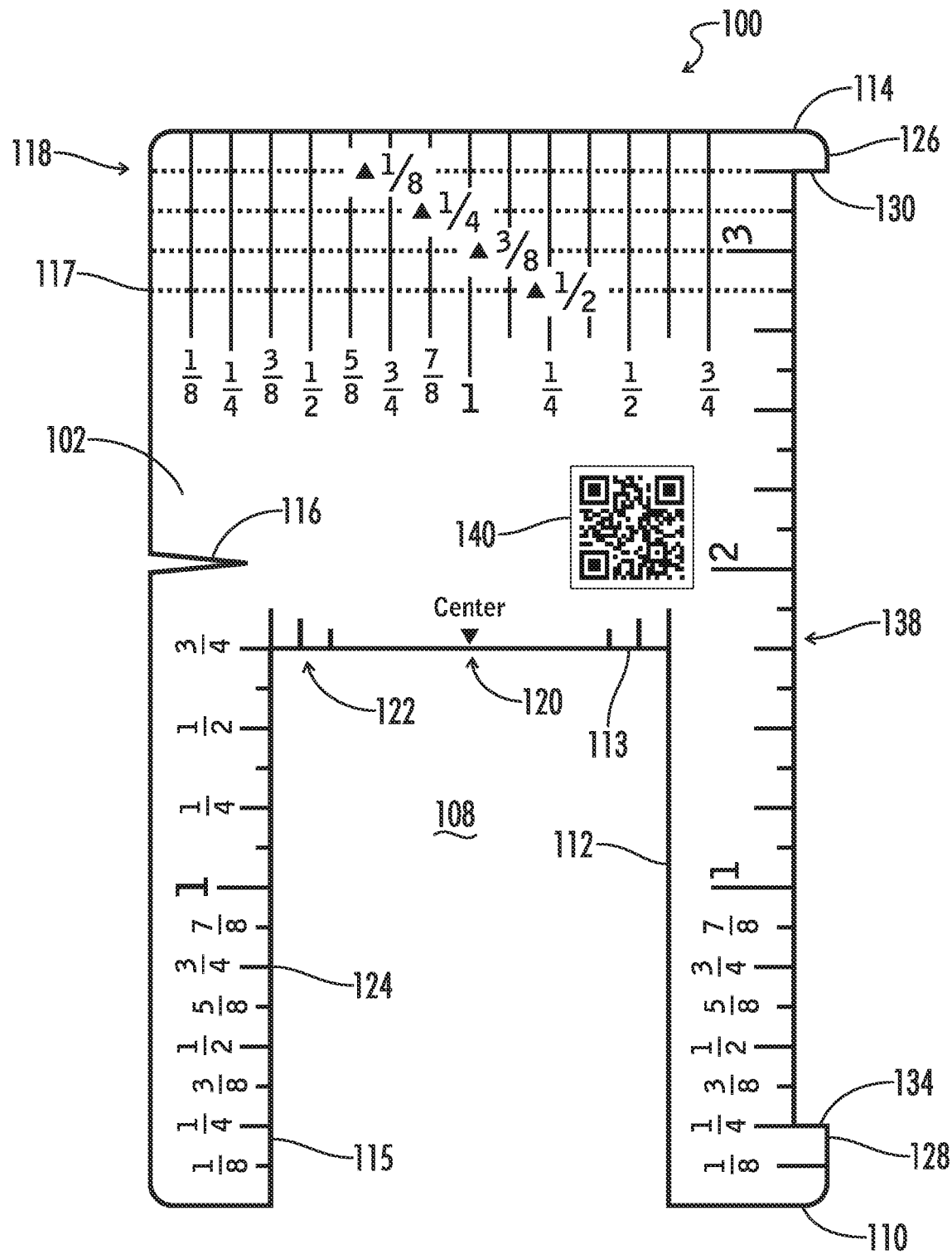
FIG. 1 is a front view of an embodiment of a tool for placing an accouterment on a uniform.
Figure 2:
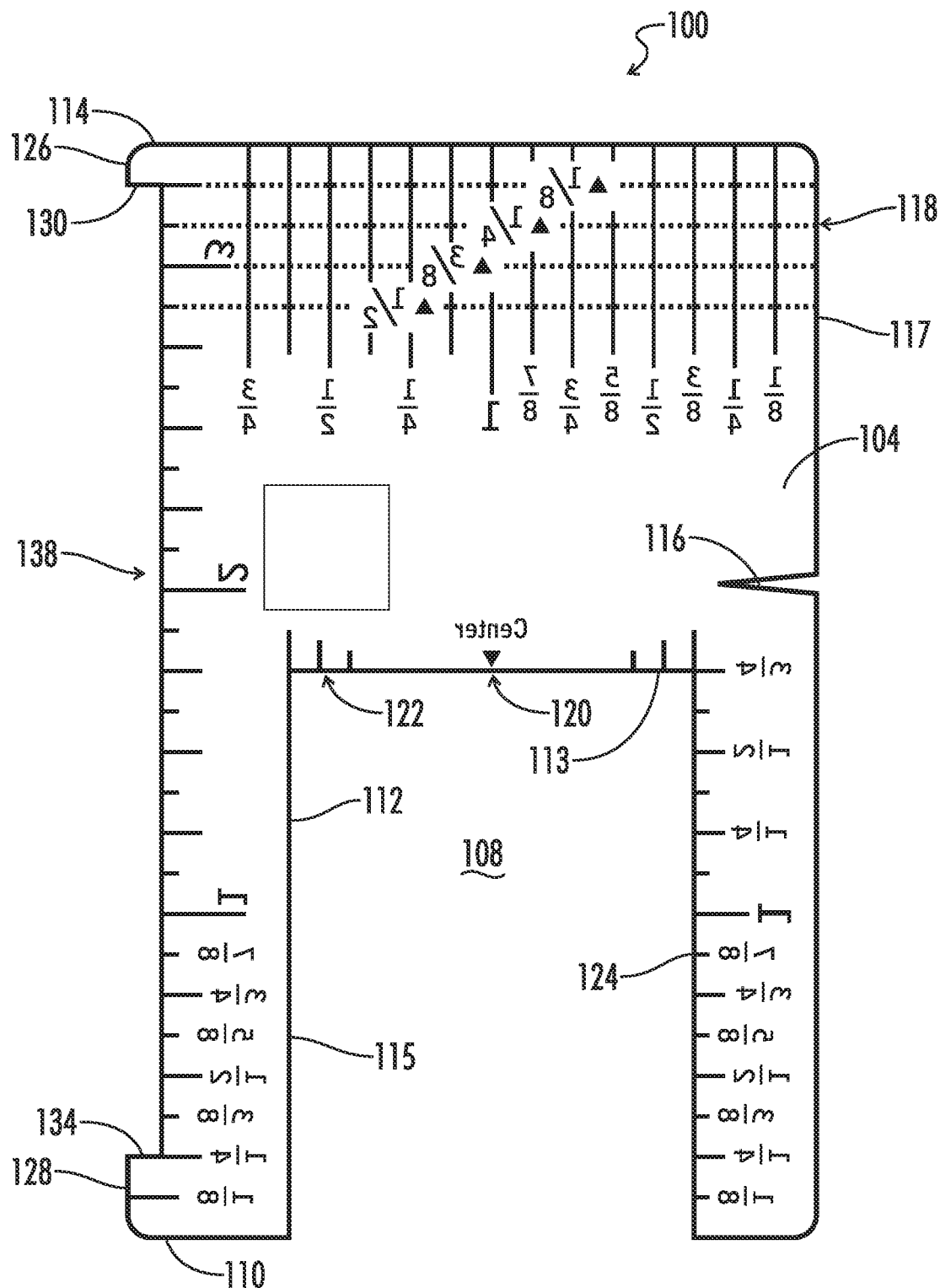
FIG. 2 is a rear view of the tool of FIG. 1.

FIGS. 1 and 2 show an embodiment of a tool for placing accouterments on a uniform. FIG. 1 shows a front view of an embodiment of a tool 100 and FIG. 2 shows the rear view of the tool 100 from FIG. 1. In one embodiment, the tool 100 can be used to place accouterments, such as medals, ribbons, awards, citations, special skill badges, insignias (e.g., U.S. insignia and branch insignia), devices or nametags on a uniform.

The tool 100 is made from a substantially planar piece of material having a generally rectangular shape. The tool 100 may have rounded corners as shown in FIGS. 1 and 2, but may have angled corners in other embodiments. In one embodiment, the tool 100 can be made from a translucent plastic. However, in other embodiments, different materials (e.g., polymers, metals, cardboard, etc.) having different optical properties (e.g., transparent or opaque) can also be used for the tool 100. In still other embodiments, the tool 100 can have different geometric shapes (e.g., square, trapezoid, rhombus, oval, etc.). The tool 100 has a first side 102 with a substantially planar surface and a second side 104 opposite the first side 102 also with a substantially planar surface. The tool 100 can have a thickness (i.e., the distance between the planar surface of the first side 102 and the planar surface of the second side 104) in the range of about 0.020 in. to about 0.050 in.

The tool 100 includes an opening 108 to receive accouterments (e.g., devices) to be placed on the uniform. As shown in FIGS. 1 and 2, the opening 108 can be arranged as a slot extending inward from an outer edge 110 of the tool 100. The opening 108 can be bordered by an edge 112 extending between the first side 102 and the second side 104. The edge 112 defines the shape of the opening 108 and in the embodiment shown in FIGS. 1 and 2 can have an inner edge 113 and two side edges 115. The inner edge 113 can be located opposite to the outer edge 110 and the two side edges 115 can be substantially perpendicular to the outer edge 110. The dimensions of the opening 108 (e.g., the width of the inner edge 113 and the lengths of the side edges 115) can be sized to receive different sizes and types of accouterments within the opening. In other words, the opening 108 can be sized to receive many different accouterments without any portion of the accouterment covering or obstructing the tool 100. In one embodiment, the opening 108 can have a substantially rectangular shape with a width of about 1.25 inches and a length of about 1.75 inches. However, in other embodiments, the opening 108 can have a width that is greater than or less than 1.25 inches and a length that is greater than or less than 1.75 inches.

In the embodiment of FIGS. 1 and 2, the opening 108 can be used to position an accouterment on the uniform of a person. To ensure that the accouterment is properly positioned on the uniform, the opening 108 can used in conjunction with several different reference indicators located adjacent to the edge 112 of the opening 108 on both the first side 102 and the second side 104 of the tool 100. One indicator on the tool 100 associated with the opening 108 can be a center locator 120 located along inner edge 113 that corresponds to the midpoint of the inner edge 113 (and the corresponding break in outer edge 110 for the opening 108).

Other indicators on the tool 100 associated with opening 108 can include two reference groups 122 located on each side of the center locator 120 along inner edge 113. Each reference group 122 can include one or more reference lines shown extending from the inner edge 113. In an embodiment, each reference line can be placed along the inner edge 113 a predefined distance from a side edge 115. In an embodiment, the reference lines in a reference group 122 can be evenly spaced apart (i.e., the distance between neighboring reference lines in a reference group 122 is substantially equal). In other embodiments, the reference lines in a reference group 122 can be unevenly spaced (i.e., the distance between neighboring reference lines 122 in a group may not be the same). Regardless of the spacing between the reference lines, a reference line in one reference group 122 on one side of the center locator 120 has a corresponding reference line in the reference group 122 on the other side of the center locator 120. In other words, each reference group 122 has a reference line placed at the same predefined distance from the corresponding side edge 115 adjacent the reference group 122 such that there is a pair of reference line evenly spaced from the side edges 115. As shown in the embodiment of FIGS. 1 and 2, the pairs of reference lines from the two reference groups 122 may have different lengths to permit a user to easily distinguish between the pairs of reference lines. However, in other embodiments, the pairs of reference lines from the two reference groups 122 may have the same length. The relative positioning of the paired reference lines from the two reference groups 122 along with the center locator 120 can enable a user to more accurately position an accouterment in opening 108 with respect to width.

Still other indicators on the tool 100 associated with the opening 108 can include a ruler 124 located on one or both of the side edges 115. The ruler 124 can show the distance from the outer edge 110 into the opening 108 along the side edge 115. The ruler 124 can enable a user to determine how far from the outer edge 110 to locate an accouterment in the opening 108.

To further assist a user in placing an accouterment on a uniform, the tool 100 can include a grid portion 118 that has a grid located on both the first side 102 and the second side 104 of the tool 100. The grid portion 118 can be located adjacent to an outer edge 114 of the tool 100, which outer edge 114 is located opposite to outer edge 110. The grid portion 118 can include two or more parallel horizontal lines and two or more parallel vertical lines to define a plurality of quadrilaterals (e.g., squares) that can be used to position the accouterment. Each of the two or more horizontal lines can be placed a predetermined distance from either the outer edge 114 or another horizontal line. To aid the user in identifying a horizontal line to use in positioning an accouterment, the horizontal lines can be labeled with the line's corresponding distance from the outer edge 114. In one embodiment, the predetermined distance associated with the horizontal lines can be about ⅛ (or 0.125) inches, but distances greater than or less than 0.125 inches can be used in other embodiments. Each of the two or more vertical lines can be placed a predetermined distance from either an outer side edge 117 of the tool 100 or another vertical line. To aid the user in identifying a vertical line to use in positioning an accouterment, the vertical lines can be labeled with the line's corresponding distance from the outer side edge 117. In one embodiment, the predetermined distance associated with the vertical lines can be about ⅛ (or 0.125) inches, but distances greater than or less than 0.125 inches can be used in other embodiments.

In another embodiment, the tool 100 may only indicate the two or more horizontal lines. The horizontal lines can be used with a slot that extends from the outer side edge 117 for a predetermined distance. The location of the horizontal lines on the tool 100 can be with respect to the slot instead of the outer edge 122 and distance indicators can be placed on the tool 100 adjacent the slot to indicate how far a specific location in the slot is from the side edge 117. The horizontal lines can be used to align the tool with a feature of the uniform (e.g., an edge of a pocket) and the slot can then be used to place an accouterment at the a predetermined vertical distance from the feature of the uniform based on the horizontal line selected. In addition, if the side edge 117 is also aligned with a feature of the uniform (e.g., another accouterment), the accouterment to be affixed to the uniform can be placed a predetermined horizontal distance from the side edge 117 based on the distance indicators associated with the slot. In one embodiment, the slot may be sized to receive the accouterment, but in other embodiments, the slot may only receive a pin of the accouterment.

In still other embodiments, the grid portion 118 (including the horizontal and vertical lines), center locator 120, reference groups 122 (including the reference lines), and ruler 124 can be indicated by embedding a material in the tool 100 that can be seen on the first side 102 and the second side 104 of the tool 100. In another embodiment, the grid portion 118 (including the horizontal and vertical lines), center locator 120, reference groups 122 (including the reference lines), and ruler 124 can be indicated by one or more protrusions extending from the first side 102 and/or the second side 104 of the tool 100 or one or more grooves formed in the first side 102 and/or the second side 104 of the tool 100.

The tool 100 has a first tab 126 and a second tab 128 extending from the tool 100. The first tab 126 and the second tab 128 can be used to space accouterments (e.g., ribbons, badges, and/or citations) to be placed on the uniform. The first tab 126 has a width corresponding to a first predetermined measurement or dimension and the second tab 128 has a width corresponding to a second predetermined measurement or dimension different from the first predetermined measurement. The width of the first tab 126 can be defined as the distance between an inner edge 130 and the outer edge 114. The width of the second tab 128 can be similarly defined as the distance between an inner edge 134 and the outer edge 110. In one embodiment, the inner edges 130, 134 of the tabs 126, 128 can define a notch in tool 100 and the outer edges 114, 110 of the tabs 126, 128 can be continuous with the outer perimeter or edge of the tool 100. In one embodiment, the width of the first tab 126 can be about ⅛ (or 0.125) inches and the width of the second tab can be about ¼ (or 0.25) inches.

The tabs 126, 128 of the tool 100 can be used to provide the proper spacing for accouterments placed on the uniform. To obtain the proper spacing for accouterments, the user has to first determine whether the first tab 126 or the second tab 128 provides the desired spacing. After the tab 126, 128 with the desired spacing is determined, the inner edge 130, 134 or the outer edge 114, 110 of the tab 126,128 can be abutted against a fixed feature or item on the uniform (e.g., a pocket edge or a ribbon that has already been affixed to the uniform) and the accouterment to be affixed to the uniform is abutted against the other edge 132, 110 of the tab 126, 128 to obtain the desired spacing. In one embodiment, the inner edge 130, 134 of the tabs 126, 128 can be placed against the fixed feature and the outer edge 114, 110 of the tabs 126, 128 can be used for the accouterment to be placed on the uniform.

A ruler 138 can be marked or placed on the first side 102 and the second side 104 of the tool 100 to assist with the positioning of the accouterment on the uniform. The ruler 138 can be marked or placed near one edge of the tool 100. To use the ruler 138 to obtain the proper positioning and/or spacing of an accouterment on the uniform, the tool 100 can be placed on the uniform and can be adjusted such that the ruler 138 can be used to obtain the measurements that are needed for the proper alignment and placement of the accouterments on the uniform.

In the embodiment shown in FIGS. 1 and 2, the tool 100 includes a 3D bar code or QR (quick response) code 140. The QR code 140 can be scanned by the user using a camera in a computing device (e.g., a smart phone or tablet) to obtain additional information regarding the placement of accouterments on the uniform. The tool 100 can also have a notched portion 116 extending inward from the outer side edge 117. The notched portion 116 can be triangular shaped with two sides that converge to a point. The notched portion 116 can be used as a thread cutter to remove extraneous threads from a uniform. Each of the sides of the notched portion 116 can be tapered to an edge to form a cutting surface that facilitates the removal of the threads from the uniform. In another embodiment, metal cutting surfaces can be placed in or on the tool at the sides of the notched portion 116 to form the cutting surface.

Figure 3:
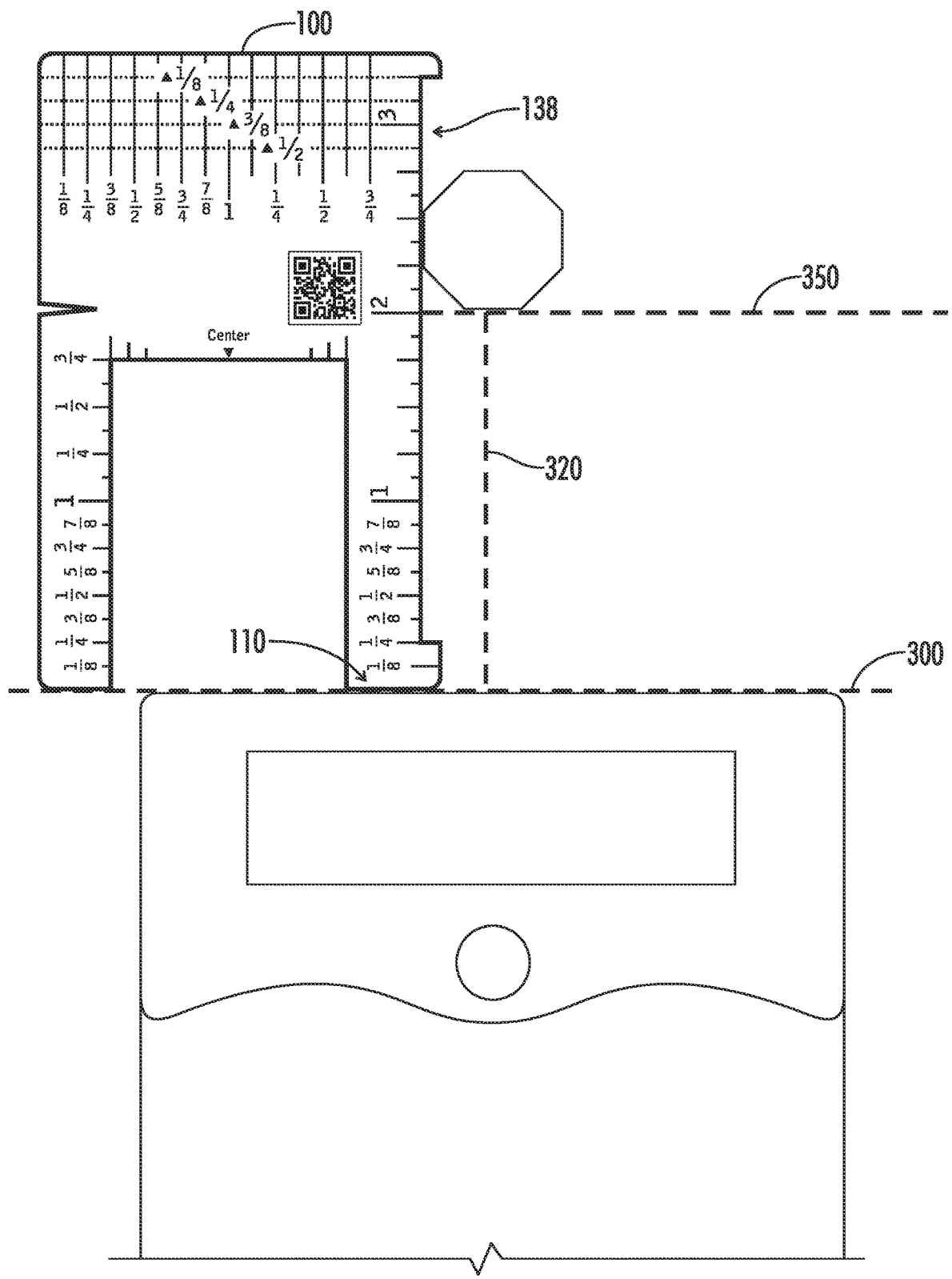
FIGS. 3-7 show embodiments of the tool being used to place accouterments on uniforms.

FIGS. 3-7 show different embodiments of the tool 100 being used to place accouterments on a uniform. In the embodiment of FIG. 3, the tool 100 can be used to place devices and/or badges on a uniform relative to a pocket of the uniform. As shown in FIG. 3, the tool 100 with first side 102 being exposed is placed substantially perpendicularly on the uniform with the outer edge 110 of the tool 100 being aligned with the edge of the pocket of the uniform (represented by dotted line 300). Once the outer edge 110 of the tool 100 is aligned with the edge of the pocket, the ruler 138 can be used to indicate (or measure) a predetermined distance from the edge of the pocket (represented by a dotted line 320). The bottom edge of the accouterment can then be aligned with the predetermined distance indicated on the ruler 138 (represented by dotted line 350) and affixed to the uniform. In one embodiment, depending on the shape of the accouterment, the accouterment may contact an edge of the tool 100 (as shown in FIG. 3) to assist with the alignment of the bottom edge of the accouterment and the predetermined distance indicated by the ruler 138.

Figure 4:
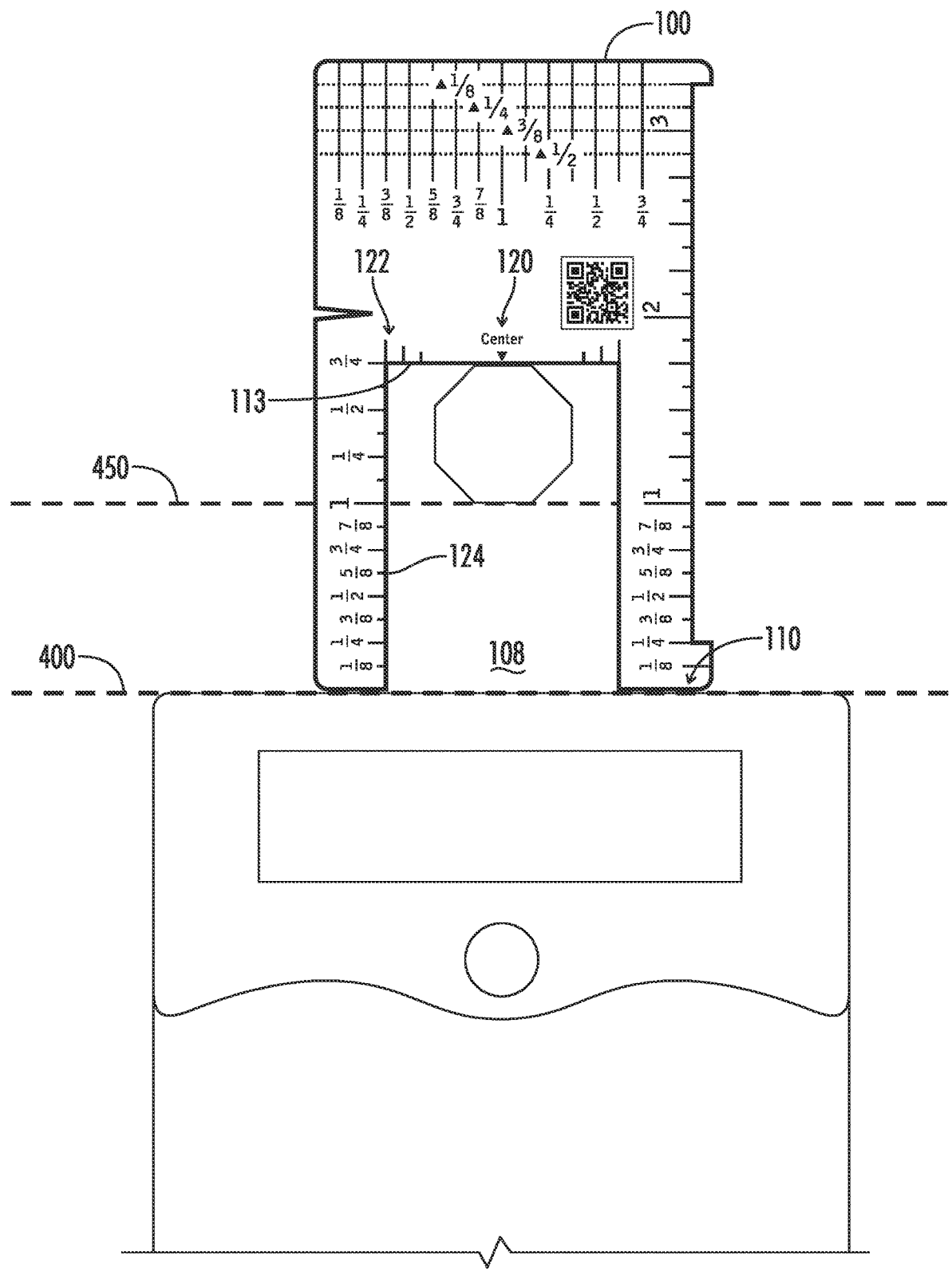

In the embodiment of FIG. 4, the tool 100 can be used to place devices and/or badges on a uniform relative to a pocket of the uniform. As shown in FIG. 4, the tool 100 with first side 102 being exposed is placed substantially perpendicularly on the uniform with the outer edge 110 of the tool 100 being aligned with the edge of the pocket of the uniform (represented by dotted line 400). Once the outer edge 110 of the tool 100 is aligned with the edge of the pocket, the opening 108 of the tool 100 can be positioned relative to the pocket of the uniform. Once the tool 100 (and opening 108) are located in a desired position, the ruler 124 can be used to indicate (or measure) a predetermined distance from the edge of the pocket to locate a bottom edge (or top edge in other embodiments) of the accouterment. As shown in FIG. 4, the accouterment can be placed in opening 108 and the bottom edge of the accouterment can then be aligned with the predetermined distance indicated on the ruler 124 (represented by dotted line 450) and affixed to the uniform. Further, the accouterment may be horizontally centered in the opening 108 (e.g., centered with respect to width) using center locator 120 and reference groups 122. In one embodiment, depending on the shape of the accouterment, the accouterment may contact the inner edge 113 of the opening 108 (as shown in FIG. 4) to assist with the horizontal centering of the accouterment in the opening 108. In an embodiment, the opening 108 can be used to place an accouterment on a uniform, if the size of the accouterment (e.g., a length and/or width dimension of the accouterment) and the predetermined distance from the edge of the pocket is less than or equal to the length of the side edge 115 as defined by ruler 124.

Figure 5:
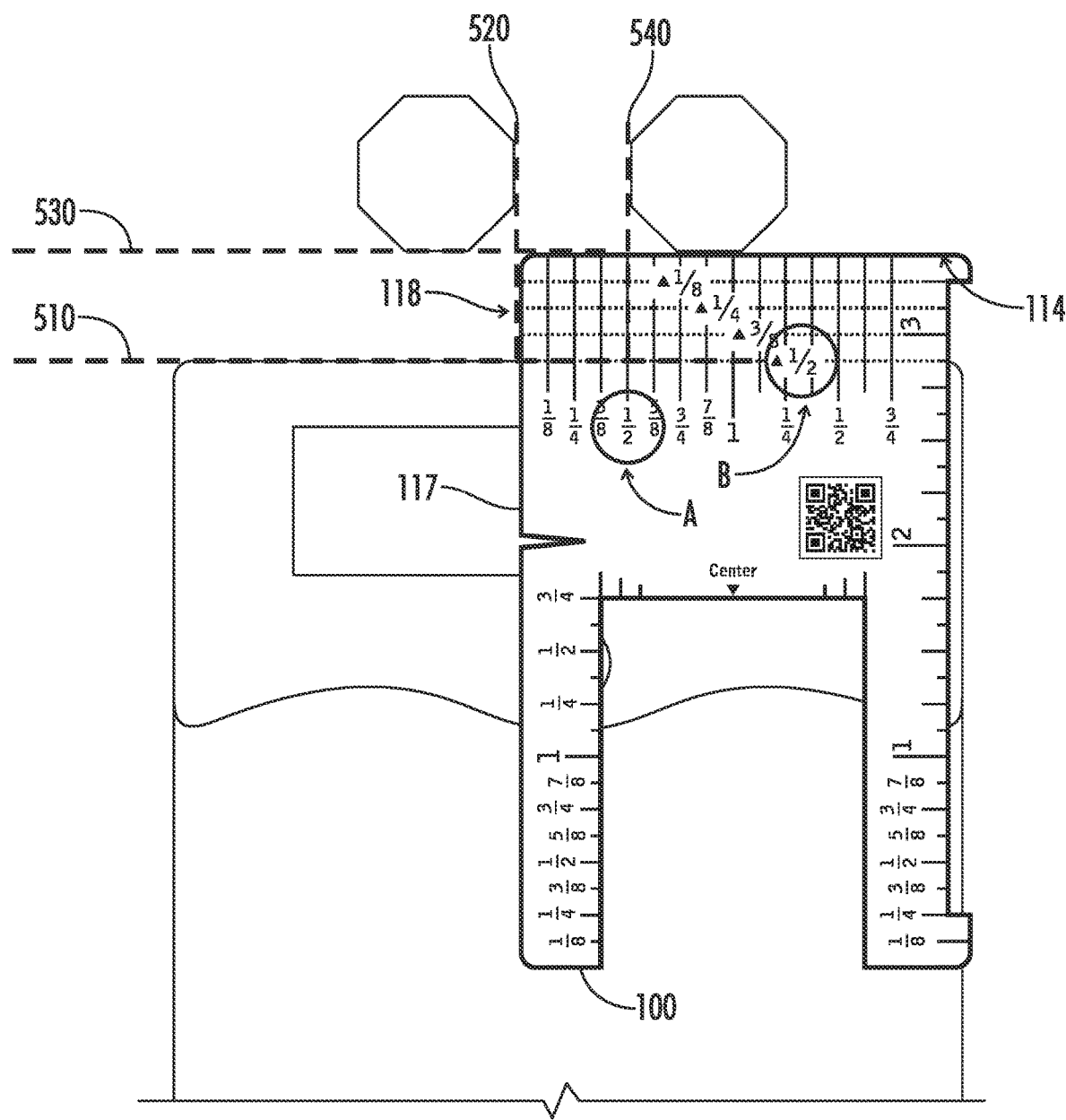

In the embodiment of FIG. 5, the tool 100 can be used to place devices and/or badges on a uniform relative to a pocket of the uniform. As shown in FIG. 5, the tool 100 with first side 102 being exposed is placed substantially perpendicularly on the uniform with a horizontal line of the grid area 118 being aligned with the edge of the pocket of the uniform (represented by dotted line 510). The horizontal line of the grid area 118 being used for alignment with the edge of the pocket is selected to provide a predetermined distance (indicated in the grid area 118 by the designation B) between the horizontal line of the grid area 118 and the outer edge 114 of the tool 100. Once the selected horizontal line of the grid area 118 is aligned with the edge of the pocket, two or more accouterments (two accouterments as shown in FIG. 5) can be aligned with the outer edge 114 of the tool 100 (represented by dotted line 530). A side edge of one of the accouterments can then be aligned with a side edge 117 of the tool 100 (represented by dotted line 520), while maintaining the alignment with outer edge 114 of the tool 100. The side edge of the other accouterment (of the two accouterments) can then be aligned with a vertical line of the grid area 118 (represented by dotted line 540). The vertical line of the grid area 118 being used for alignment with the side edge of the other accouterments is selected to provide a predetermined distance (indicated in the grid area 118 by the designation A) between the side edges of the two accouterments. Once the selected vertical line of the grid area 118 is aligned with the side edge of the accouterment, the two accouterments can be aligned both vertically (e.g., with respect to the outer edge 122 of the tool 100) and horizontally (e.g., with respect to side edge 117 and the selected vertical line of the grid area 118) and affixed to the uniform.

Figure 6:
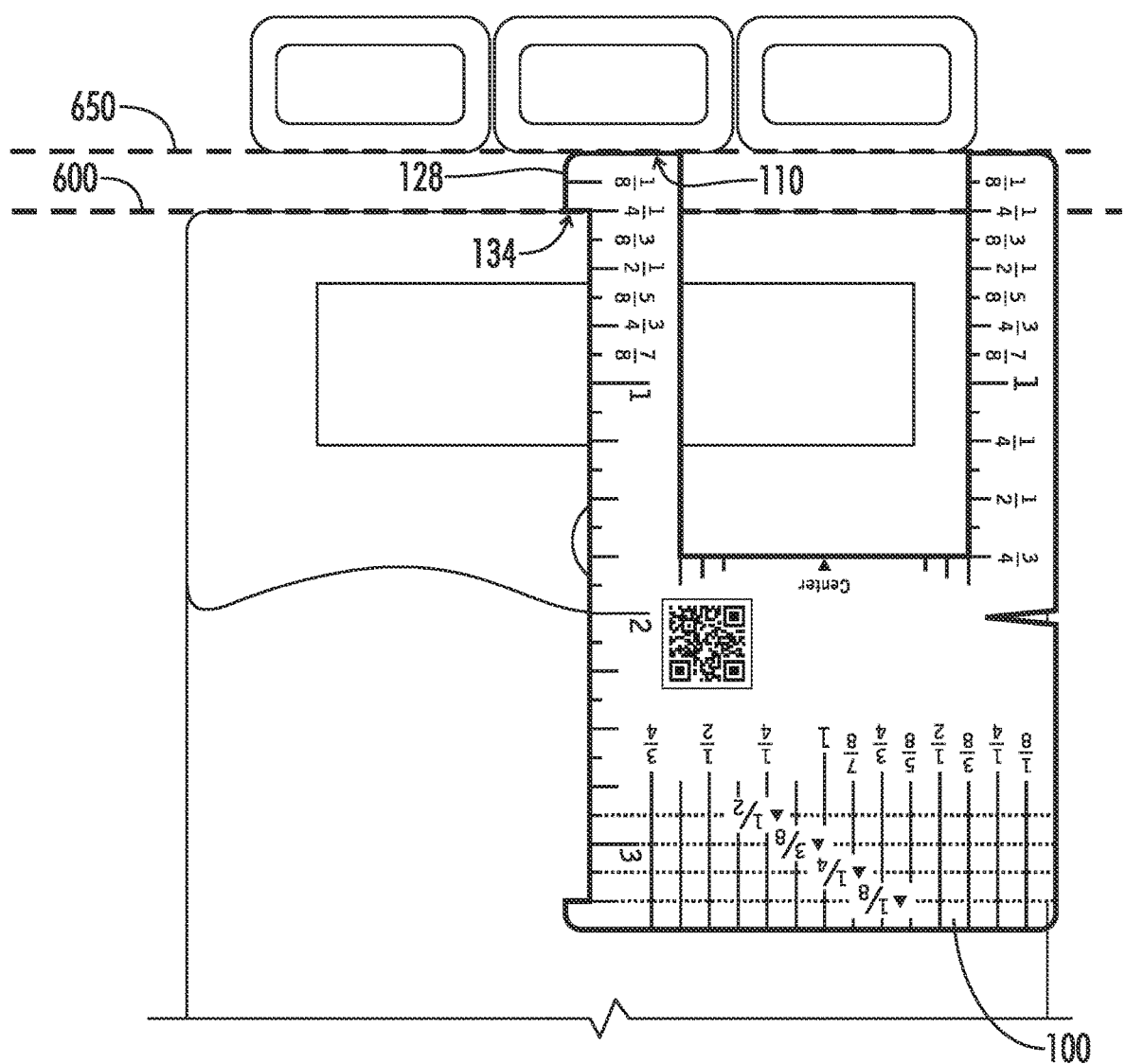
Figure 7:
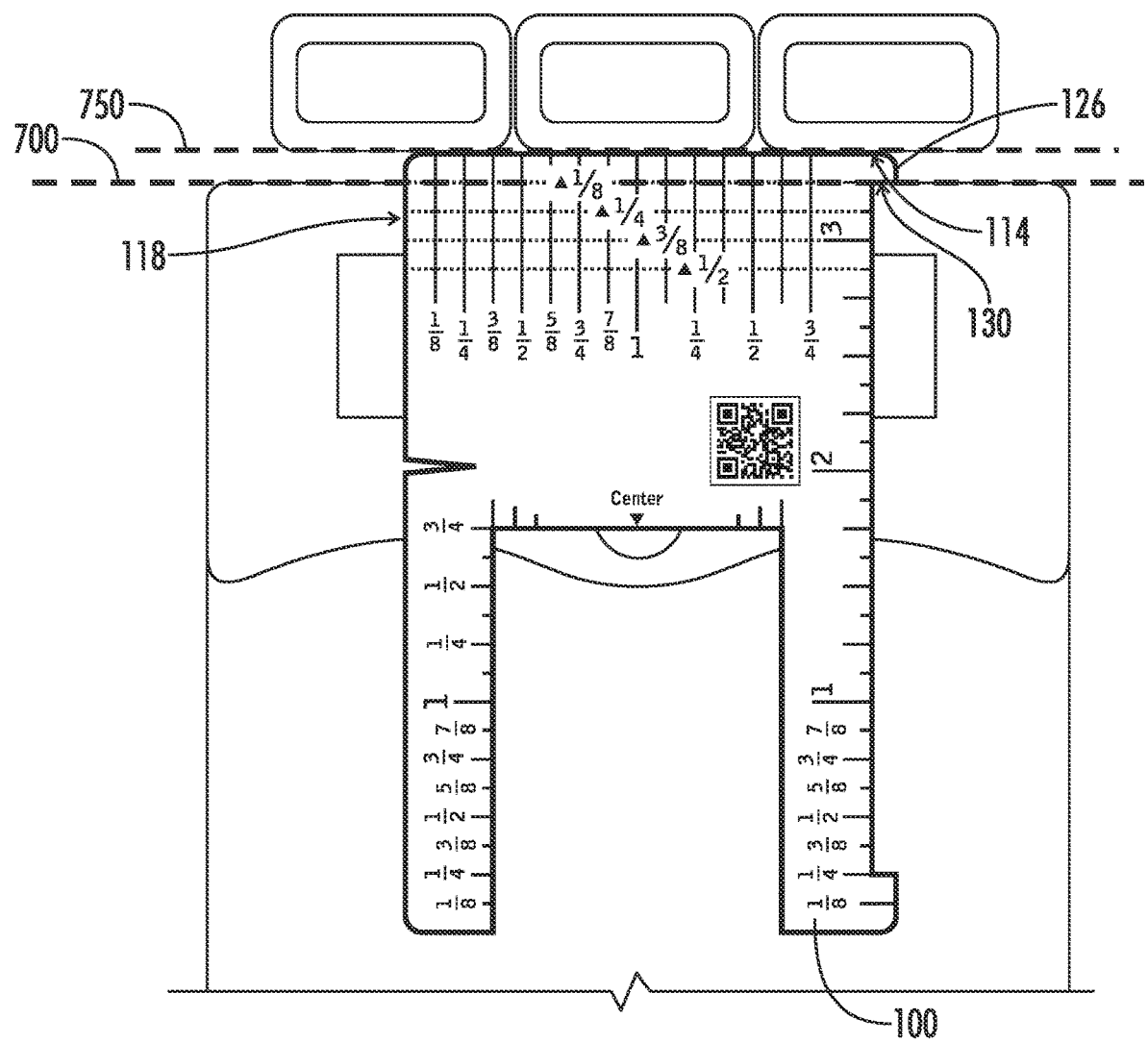

In the embodiment of FIGS. 6 and 7, the tool 100 can be used to place ribbons and/or citations on a uniform relative to a pocket of the uniform. As shown in FIG. 6, the tool 100 with first side 102 being exposed is placed substantially perpendicularly on the uniform with the inner edge 134 of tab 128 being aligned with the edge of the pocket on the uniform (represented by dotted line 600). Once the inner edge 134 is aligned with the edge of the pocket, the one or more accouterments that have been centered on the uniform (or otherwise appropriately placed on the uniform) can be aligned with the outer edge 110 of the tab 128 (represented by dotted line 650) and affixed to the uniform. As shown in FIG. 7, the tool 100 with first side 102 being exposed is placed substantially perpendicularly on the uniform with the inner edge 130 of tab 126 being aligned with the edge of the pocket of the uniform (represented by dotted line 700). In an alternate embodiment, one of the horizontal lines of the grid area 118 (corresponding to the width of the tab 126) can be aligned with the edge of the pocket of the uniform. Once the inner edge 130 (or a horizontal line of the grid area 118) is aligned with the edge of the pocket, one or more accouterments that have been centered on the uniform (or otherwise appropriately placed on the uniform) can be aligned with the outer edge 114 of the tab 126 (represented by dotted line 750) and affixed to the uniform.

Figure 8:
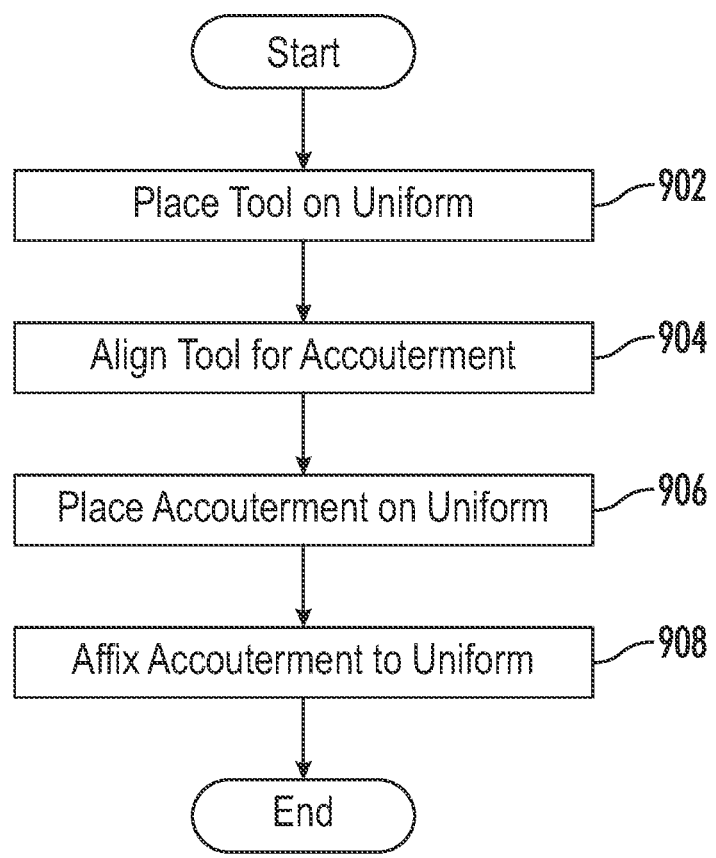
FIG. 8 shows an embodiment of a process for placing an accouterment on a uniform.

FIG. 8 shows an embodiment of a process for placing accouterments on a uniform. The process begins by placing the tool 100 on the uniform (step 902) with either the first side 102 or the second side 104 being exposed (i.e., the side facing away from the uniform). Depending on the accouterment to be placed on the uniform, either side of the tool 100 may be exposed. For example, either side of the tool 100 can be exposed when using tabs 126, 128, grid portion 118 or opening 108. After the tool 100 is placed on the uniform, the tool 100 has to be aligned on the uniform (step 904) for placement of the accouterment. The alignment of the tool 100 can involve aligning one of tabs 126, 128, grid portion 118 and/or opening 108 with a pocket or affixed accouterment on the uniform.

When the tool 100 is aligned on the uniform, the accouterment is placed on the uniform (step 906). The placement of the accouterment can include positioning the accouterment in the opening 108 or aligning an edge of an accouterment with an outer edge 114, 110 of a tab 126, 128. Once the accouterment is placed in the proper position according to the tool 100, the accouterment can be affixed or attached to the uniform (step 908).

Although the figures herein may show a specific order of method steps, the order of the steps may differ from what is depicted. Also, two or more steps may be performed concurrently or with partial concurrence. It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A tool to position accouterments on a uniform, comprising:
    a component having a first planar surface, a second planar surface opposite the first planar surface and an outer edge extending along a perimeter of the first planar surface and the second planar surface, the component also having an opening extending through the component for receiving an accouterment to be placed on a uniform, the opening extending inward from the outer edge;
    the opening having a substantially rectangular shape with a pair of side edges extending inward from the outer edge and an inner edge extending between the pair of side edges;
    at least one reference indicator indicated on the first planar surface adjacent the opening, the at least one reference indicator configured to permit a user to position an accouterment within the opening;
    wherein the opening is configured to permit a user to position the accouterment at a predetermined location on the uniform upon the outer edge of the component being aligned with a feature of the uniform and the accouterment being aligned in the opening with respect to the at least one reference indicator;
    wherein the at least one reference indicator includes a center locator indicated on the first planar surface adjacent the inner edge of the opening; and
    wherein the center locator indicates a midpoint of the inner edge.

2. The tool of claim 1, wherein the at least one reference indicator further includes two reference groups indicated on the first planar surface adjacent the inner edge, the two reference groups being located on opposed sides of the center locator, the two reference groups being configured to permit a user to align edges of the accouterment in the opening, wherein each reference group of the two reference groups includes one or more reference lines.

3. The tool of claim 2, wherein the two reference groups include one or more pairs of reference lines configured to permit a user to align edges of the accouterment in the opening, wherein each pair of reference lines includes a reference line from one reference group located a predetermined distance from one side edge and a corresponding reference line from the other reference group located the predetermined distance from the other side edge.

4. The tool of claim 1, wherein the at least one reference indicator includes at least one ruler indicated on the first planar surface adjacent at least one side edge of the opening, wherein the at least one ruler is configured to indicate a distance in the opening from the outer edge.

5. The tool of claim 1, further comprising a grid indicated on the first planar surface adjacent to the outer edge, wherein the grid includes at least two horizontal lines having a predetermined spacing relative to a first portion of the outer edge that is substantially parallel to the at least two horizontal lines, and at least two vertical lines having a predetermined spacing relative to a second portion of the outer edge that is substantially parallel to the at least two vertical lines, wherein the grid is configured to permit a user to both horizontally and vertically align an accouterment on the uniform upon the component being aligned with a feature of the uniform.

6. The tool of claim 1, further comprising at least one tab extending from the component, the at least one tab having a width corresponding to a dimension used to place an accouterment on a uniform.

7. The tool of claim 1, wherein the component is made of a translucent material and the at least one reference indicator is visible from the second planar surface.

8. The tool of claim 1, further comprising at least one ruler indicated on the first planar surface, the at least one ruler being located adjacent to the outer edge of the component.

9. A tool to position accouterments on a uniform, comprising:
    a component having a first planar surface, a second planar surface opposite the first planar surface and an outer edge extending along a perimeter of the first planar surface and the second planar surface, the component also having an opening extending through the component for receiving an accouterment to be placed on a uniform, the opening extending inward from the outer edge and having a pair of side edges extending inward from the outer edge and an inner edge extending between the pair of side edges;

a notch extending inward from the outer edge of the component, wherein the notch comprises a tapered surface having an edge configured to cut a thread on the uniform; and at least one reference indicator indicated on the first planar surface adjacent the opening, the at least one reference indicator configured to permit a user to position an accouterment within the opening;

wherein the opening is configured to permit a user to position the accouterment at a predetermined location on the uniform upon the outer edge of the component being aligned with a feature of the uniform and the accouterment being aligned in the opening with respect to the at least one reference indicator.

10. A tool to position accouterments on a uniform, comprising:

a component having a first planar surface, a second planar surface opposite the first planar surface and an outer edge extending along a perimeter of the first planar surface and the second planar surface;

a grid indicated on the first planar surface adjacent to the outer edge, wherein the grid includes at least two horizontal lines having a first predetermined spacing relative to a first portion of the outer edge that is substantially parallel to the at least two horizontal lines, and at least two vertical lines having a second predetermined spacing relative to a second portion of the outer edge that is substantially parallel to the at least two vertical lines, wherein the grid is configured to permit a user to both horizontally and vertically align an accouterment on the uniform upon the component being aligned with a feature of the uniform;

the component having an opening extending through the component for receiving an accouterment to be placed on a uniform, the opening extending inward from a third portion of the outer edge opposite the first portion, the opening having a pair of side edges extending inward from the third portion of the outer edge and an inner edge extending between the pair of side edges; and a plurality of reference indicators indicated on the first planar surface adjacent the opening, the plurality of reference indicators configured to permit a user to position an accouterment within the opening, wherein a reference indicator of the plurality of reference indicators includes a center locator adjacent the inner edge of the opening indicating a midpoint of the inner edge.

11. The tool of claim 10, wherein one or more of the at least two horizontal lines or the at least two vertical lines is configured to permit a user to align the component with a feature of the uniform.

12. The tool of claim 10, wherein:

each horizontal line of the at least two horizontal lines has a first distance indicator indicated on the first planar surface, wherein the first distance indicator indicates the distance from the first portion of the outer edge to the corresponding horizontal line; and each vertical line of the at least two vertical lines has a second distance indicator indicated on the first planar surface, wherein the second distance indicator indicates the distance from the second portion of the outer edge to the corresponding vertical line.

13. The tool of claim 10, wherein the first predetermined spacing and the second predetermined spacing are substantially equal.

14. A method of placing an accouterment on a uniform, the method comprising:

placing a tool on the uniform, the tool having an opening extending from an outer edge of the tool and at least one reference indicator associated with the opening, wherein the opening has a pair of side edges extending from the outer edge of the tool and an inner edge extending between the pair of side edges;

aligning the outer edge of the tool having the opening with a feature of the uniform;

placing the accouterment in the opening;

aligning the accouterment with the at least one reference indicator on the tool to position the accouterment on the uniform, wherein the aligning the accouterment includes aligning the accouterment with a center locator indicated on the tool adjacent the inner edge, and wherein the center locator indicates a midpoint of the inner edge; and affixing the accouterment placed in the opening to the uniform upon the accouterment being aligned with the at least one reference indicator associated with the opening.

15. The method of claim 14, wherein the aligning the accouterment further includes placing the accouterment a predetermined distance from the outer edge of the tool, wherein the predetermined distance is measured with a ruler indicated on the tool adjacent to at least one of the side edges.

16. The method of claim 14, wherein the aligning the accouterment further includes aligning edges of the accouterment with respect to two reference groups positioned on either side of the center locator, wherein each reference group of the two reference group includes one or more reference lines.

17. The method of claim 16, wherein aligning edges of the accouterment further includes aligning edges of the accouterment with respect to a pair of reference lines, wherein the pair of reference lines include a reference line from one reference group located a predetermined distance from one side edge and a corresponding reference line from the other reference group located the predetermined distance from the other side edge.

* * * * *